(12) United States Patent
Sharma et al.

(10) Patent No.: US 12,450,744 B2
(45) Date of Patent: Oct. 21, 2025

(54) METHOD AND SYSTEM FOR IMPROVED VESSEL COVERAGE FROM ANGIOGRAPHY

(71) Applicant: SIEMENS HEALTHINEERS AG, Forchheim (DE)

(72) Inventors: Puneet Sharma, Princeton Junction, NJ (US); Mehmet Akif Gulsun, Princeton, NJ (US); Tiziano Passerini, Plainsboro, NJ (US); Serkan Cimen, Jersey City, NJ (US); Dominik Neumann, Erlangen (DE); Martin Berger, Bubenreuth (DE); Martin von Roden, Austin, TX (US)

(73) Assignee: Siemens Healthineers AG, Forchheim (DE)

( * ) Notice: Subject to any disclaimer, the term of this patent is extended or adjusted under 35 U.S.C. 154(b) by 344 days.

(21) Appl. No.: 18/341,920

(22) Filed: Jun. 27, 2023

(65) Prior Publication Data
US 2024/0046465 A1 Feb. 8, 2024

(30) Foreign Application Priority Data
Aug. 8, 2022 (EP) .................................... 22189213

(51) Int. Cl.
*A61B 6/50* (2024.01)
*A61B 6/00* (2024.01)
*G06T 7/00* (2017.01)

(52) U.S. Cl.
CPC ............ *G06T 7/0012* (2013.01); *A61B 6/504* (2013.01); *G06T 2207/30048* (2013.01)

(58) Field of Classification Search
CPC ......... G06T 7/0012; G06T 2207/30048; A61B 6/504; A61B 6/032; A61B 6/5205; A61B 6/466; A61B 6/545; A61B 6/481
See application file for complete search history.

(56) References Cited

U.S. PATENT DOCUMENTS

| 7,020,510 B2 * | 3/2006 | Suurmond | .............. G06T 19/00 600/425 |
| 2017/0236326 A1 | 8/2017 | Aben et al. | |
| 2022/0172368 A1 | 6/2022 | Lavi et al. | |

OTHER PUBLICATIONS

U.S. Appl. No. 18/181,004, filed Mar. 9, 2023.
U.S. Appl. No. 18/165,510, filed Feb. 7, 2023.
Extended European Search Report (EESR) mailed Jan. 27, 2023 in corresponding European Patent Application No. 22189213.6.

* cited by examiner

*Primary Examiner* — Siamak Harandi

(57) ABSTRACT

Angiography angles are determined. Patient information and target vessel information are obtained, wherein the patient information defines individual medical information of a patient and wherein the target vessel information defines at least one target vessel to be imaged. At least one angiography angle is determined based on the patient information and the target vessel information. Angiograms obtained using the at least one angiography angle are analyzed to determine a vessel coverage of the target vessel and based on the vessel coverage determines additional angiography angles.

19 Claims, 5 Drawing Sheets

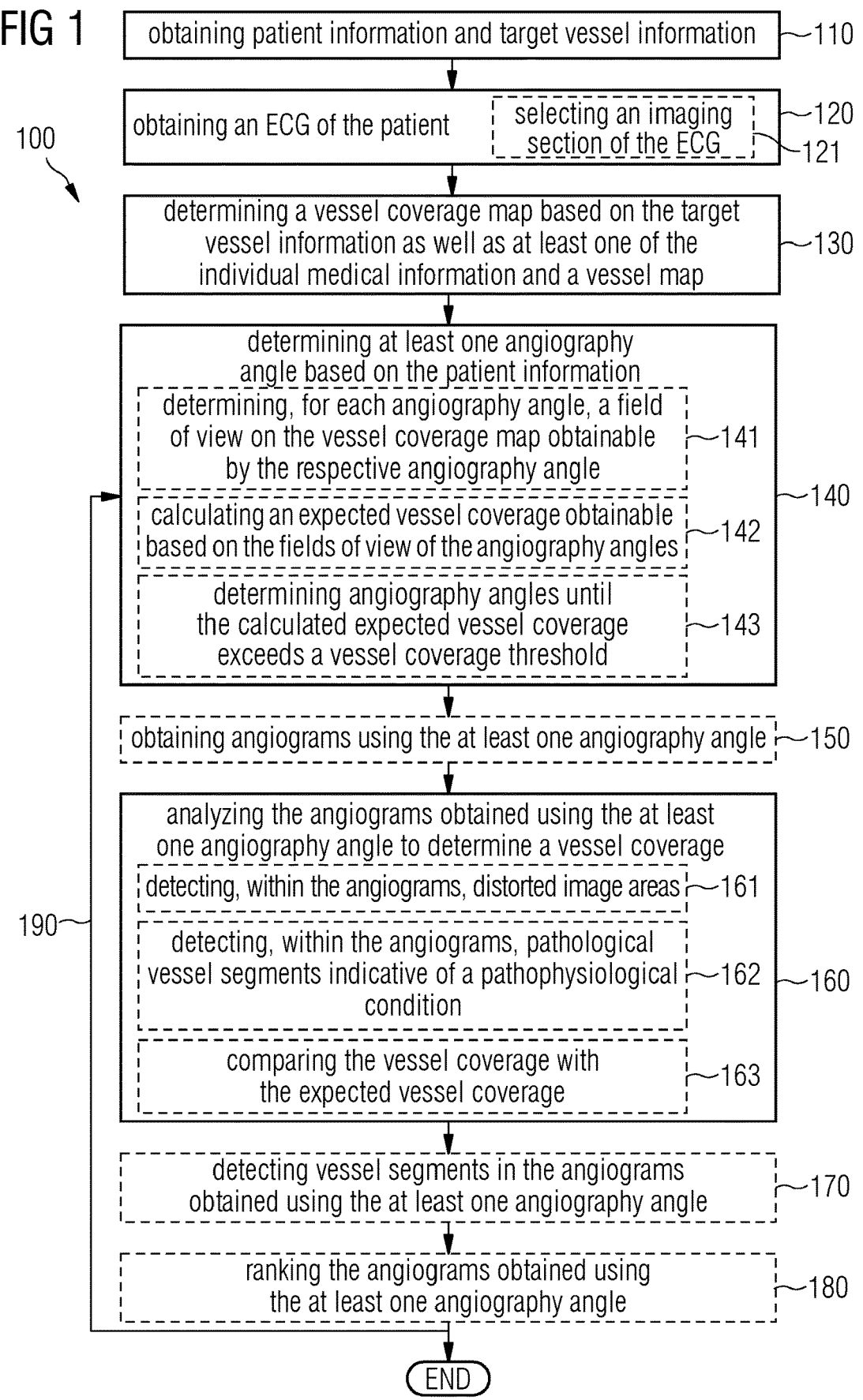

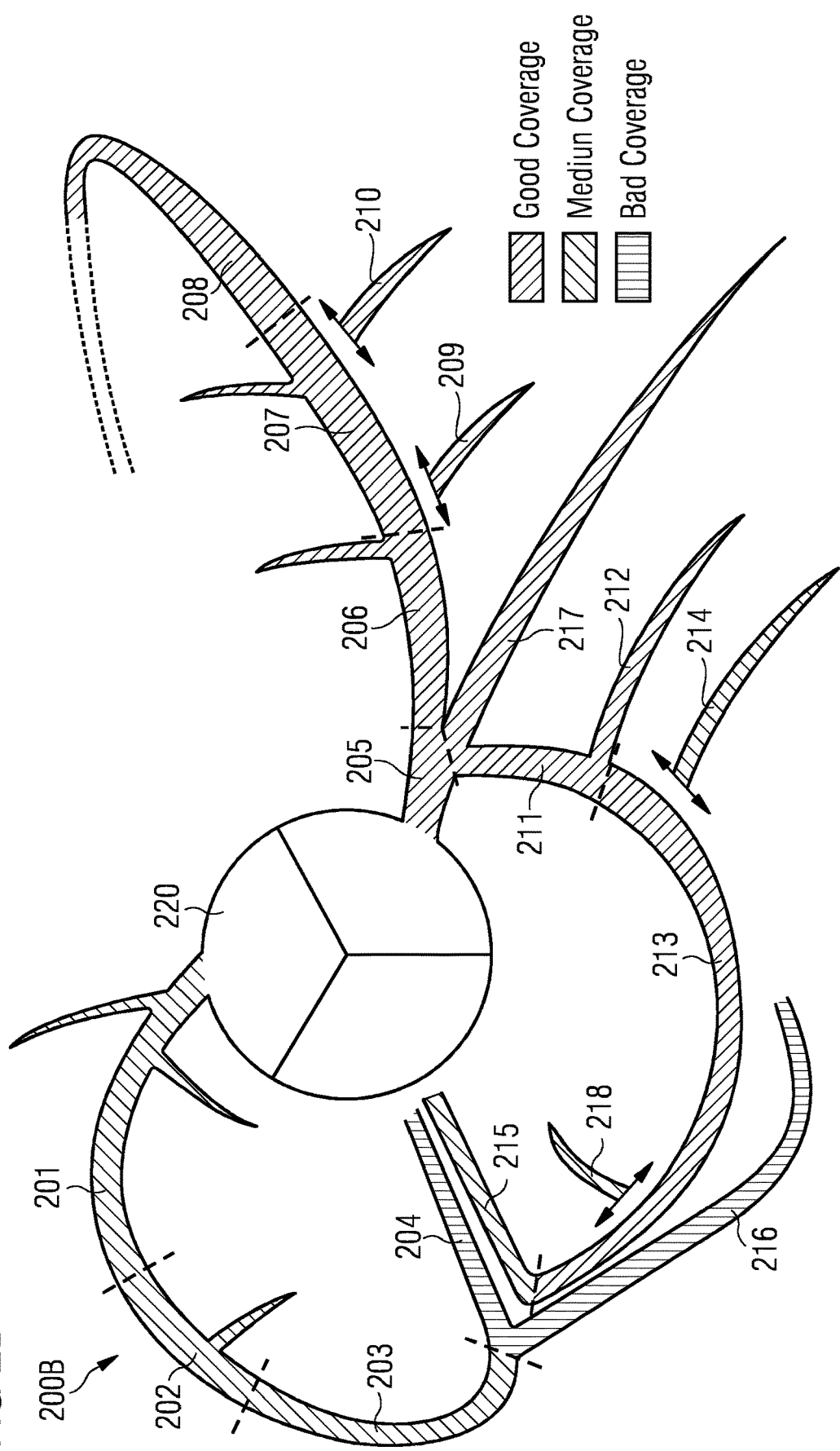

METHOD AND SYSTEM FOR IMPROVED VESSEL COVERAGE FROM ANGIOGRAPHY

RELATED APPLICATION

This application claims the benefit of EP 22189213.6, filed Aug. 8, 2022, which is hereby incorporated by reference in its entirety

TECHNICAL FIELD

The current disclosure generally relates to imaging vessels using angiography. More specifically, the disclosure relates to determining angiography angles enabling angiograms with improved vessel coverage.

BACKGROUND

When imaging vessels using angiography, the medical specialist operating the angiography system usually obtains angiograms providing standard vessel views or projections based on standard vessel geometry assumptions of a vessel to be imaged. To obtain these angiograms, the medical specialist has to move the C arm of an angiography system to different angiography angles with regard to a neutral position of the C arm. Determination of these angiography angles is typically performed by the medical specialist based on the standard vessel geometry assumptions and on prior experience. The angiography angles are thus not based on the individual patient and depend on the skill of the medical specialist. These angiography angles may thus lead to a generally incomplete vessel coverage and may include areas of overlap or foreshortening.

Moreover, typically, some number of standard vessel views is used to obtain a vessel coverage deemed sufficient, e.g., three to five in the case of coronary arteries or one to three in the case of renal arteries. Again, depending on the experience of the medical specialist, they may decide to obtain additional vessel views at further angiography angles to increase vessel coverage. However, both the standard vessel views and potentially some additional vessel views may not result in a sufficiently complete vessel coverage.

Therefore, it is an objective to provide an accurate determination of angiography angles leading to complete coverage of a vessel to be imaged using angiography.

SUMMARY

To achieve this objective, the present approach provides an angiography method for determining angiography angles, including the acts of obtaining patient information and target vessel information, wherein the patient information defines individual medical information of a patient and wherein the target vessel information defines at least one target vessel to be imaged, determining at least one angiography angle based on the patient information and the target vessel information, analyzing angiograms obtained using the at least one angiography angle to determine a vessel coverage of the target vessel and, based on the vessel coverage, determining additional angiography angles.

Further, the present approach provides an angiography device, including x-ray imaging means rotatably arranged around a patient surface, the patient surface configured to support a patient, wherein the x-ray imaging means are configured to be rotated around the patient surface according to an angiography angle, and processing means including at least one processor, the processor configured to determine angiography angles by: obtaining patient information and target vessel information, wherein the patient information defines individual medical information of a patient and wherein the target vessel information defines at least one target vessel to be imaged, determining at least one angiography angle based on the patient information and the target vessel information, analyzing angiograms obtained using the at least one angiography angle to determine a vessel coverage of the target vessel and, based on the vessel coverage, determining additional angiography angles.

Finally, the present approach provides a non-transitory computer-readable storage medium, configured to store instructions, the instructions being configured to be performed by at least one processor, wherein the instructions cause the at least one processor to perform: obtaining patient information and target vessel information, wherein the patient information defines individual medical information of a patient and wherein the target vessel information defines at least one target vessel to be imaged, determining at least one angiography angle based on the patient information and the target vessel information, analyzing angiograms obtained using the at least one angiography angle to determine a vessel coverage of the target vessel and, based on the vessel coverage, determining additional angiography angles.

BRIEF DESCRIPTION OF THE DRAWINGS

Embodiments will be described with reference to the following appended drawings, in which like reference signs refer to like elements.

FIG. 1 provides a flowchart of an angiography method for determining angiography angles according to embodiments.

FIG. 2B shows an example vessel coverage map providing a 2D view of the coronary artery segments.

It should be understood that these drawings are in no way meant to limit the disclosure of the present invention. Rather, these drawings are provided to assist in understanding the invention. The person skilled in the art will readily understand that aspects of the present invention shown in one drawing may be combined with aspects in another drawing or may be omitted without departing from the scope of the present invention.

DETAILED DESCRIPTION

A method and a system for determining angiography angles are provided. Based on patient information and target vessel information, the method determines at least one angiography angle. The at least one angiography angle may then be provided to a medical specialist operating an angiography system or the angiography system itself to obtain angiograms based on the at least one angiography angle. The method then analyzes the angiograms to determine how complete the angiograms cover the target vessel. If the coverage is deemed incomplete, the method determines additional angiography angles, which are again provided to a medical specialist operating an angiography system or the angiography system itself to obtain angiograms. The method again analyzes the resulting angiograms with regard to vessel coverage. The method repeats the acts of determining angiography angles and analyzing resulting angiograms until the method deems the coverage of the target vessel to be complete.

Figure 2A:
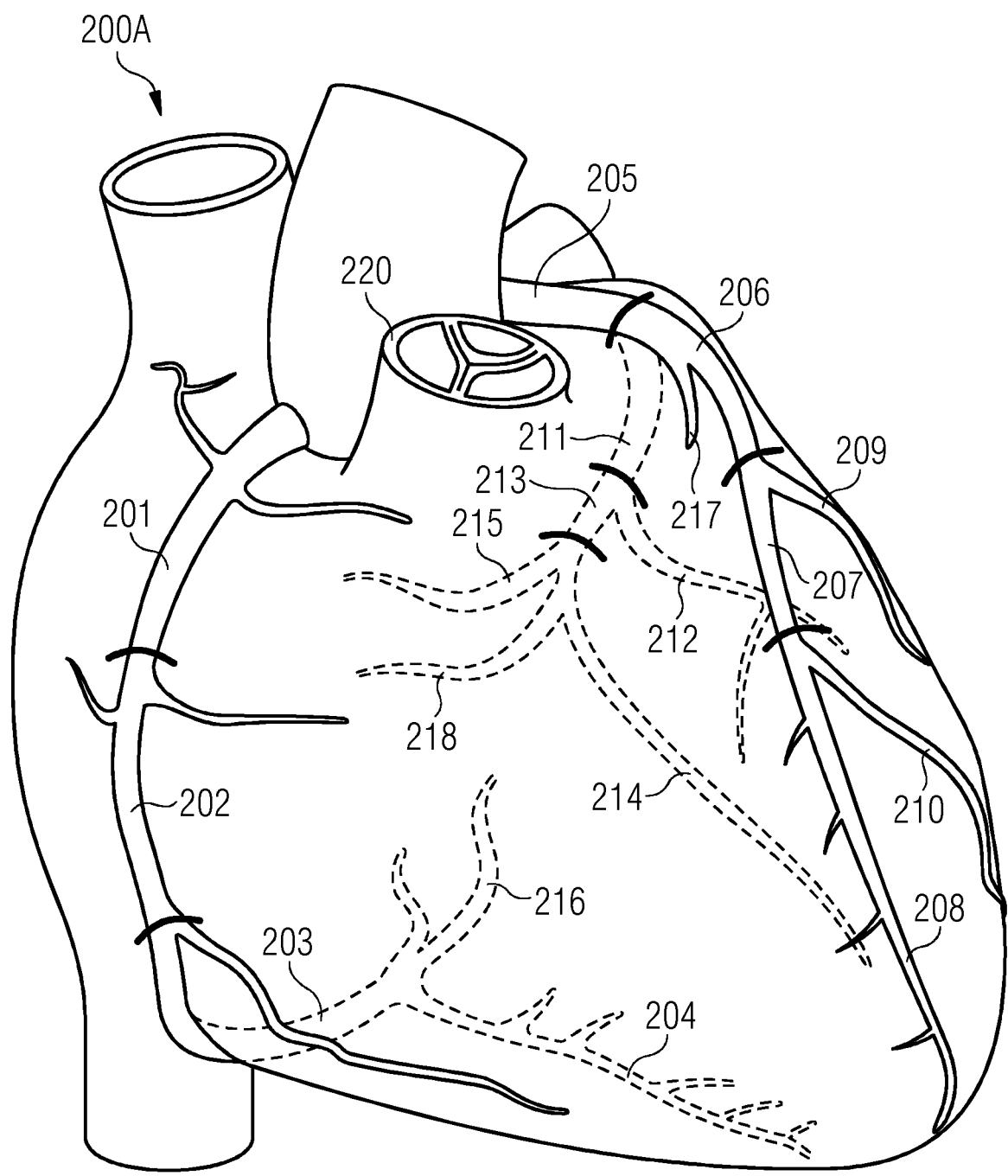
FIG. 2A shows an example 3D frontal view of a heart and the coronary artery segments.

The general principle of the method discussed above will now be illustrated based on FIG. 1, which provides a flowchart of the method acts, in conjunction with FIGS. 2A to 3, which help to illustrate various aspects of the angiography method. Accordingly, FIG. 1 serves as a guide through the embodiments of the method while FIGS. 2A to 3 are used to illustrate the various actions and decisions performed and made, respectively, at various acts of the method as well as the various expressions referred to throughout this disclosure.

FIG. 1 provides a flowchart of an angiography method 100 for determining angiography angles α. An angiography angle α in the sense of the present application is the angle formed between the neutral position of a C arm of an angiography system and the imaging position of the C arm. To visualize this definition, the definition will be further explained with reference to FIGS. 3A and 3B.

Figure 3A:
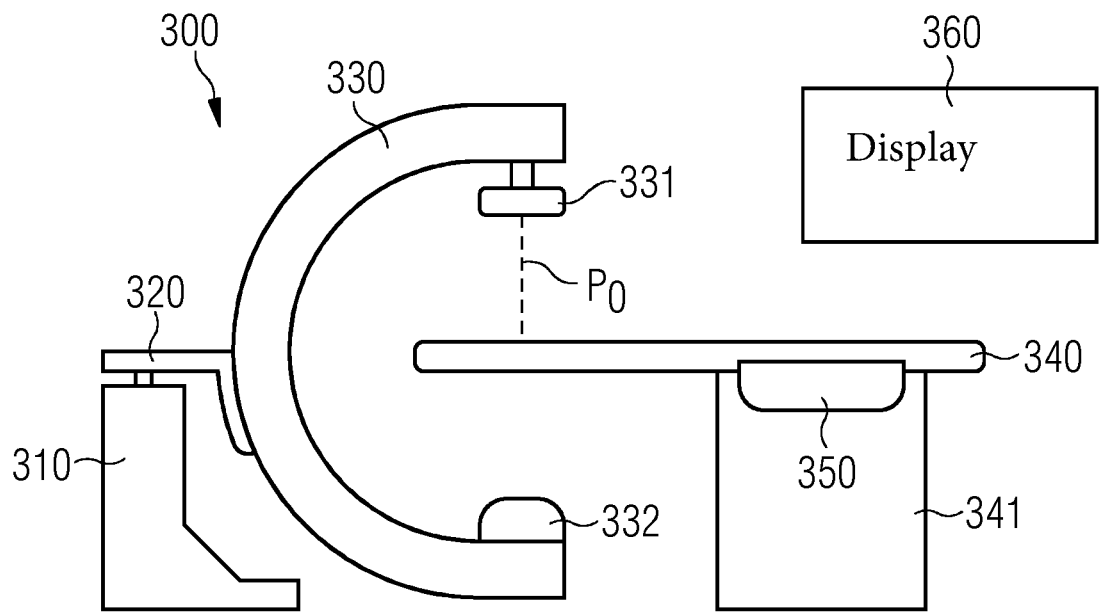
FIGS. 3A and 3B show an exemplary angiography system according to embodiments.
Figure 3B:
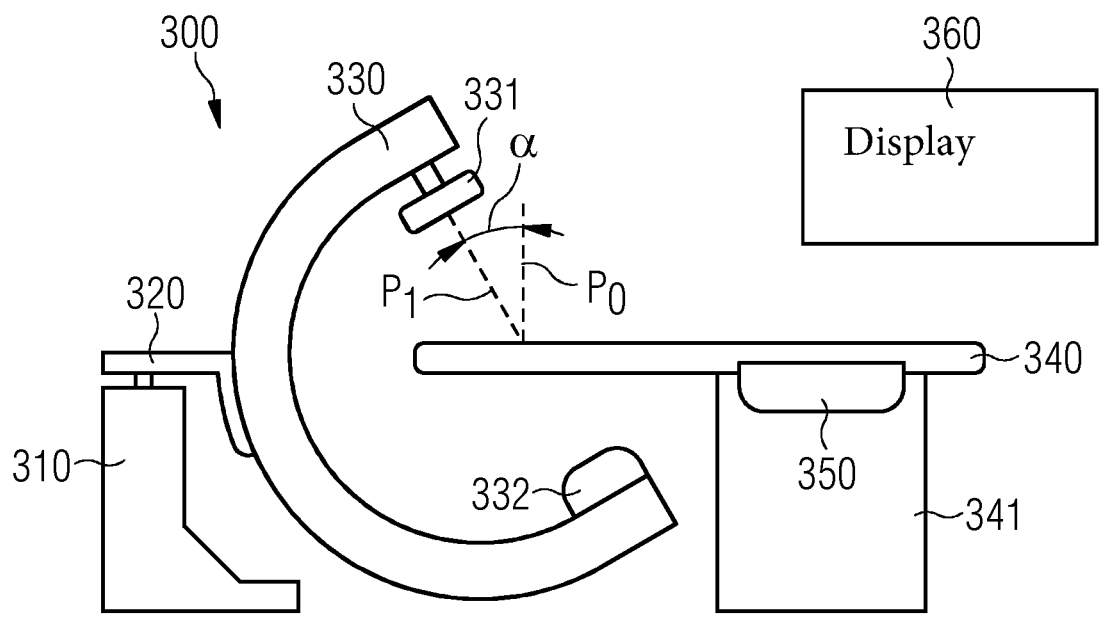

Referring to FIGS. 3A and 3B, both show an angiography system 300 including a rotatable C arm 330. X-ray emitter 331 and X-ray detector 332 may be mounted on C arm 330. In FIG. 3A, C arm 330 is in a neutral position $P_0$, i.e., X-ray emitter 331 is located directly above a patient surface 340. In FIG. 3B, C arm 330 and thereby X-ray emitter 331 is rotated counter-clockwise with respect to neutral position $P_0$ of C-arm 330 in FIG. 3A to a position $P_1$. The angle between position P0 and position P1, as indicated in FIG. 3B is referred to as the angiography angle α.

The neutral position may also be referred to as the anterior projection (ap) since in this position, X-ray emitter 331 is in front of, i.e., anterior to, the patient being imaged. It will therefore be understood that the neutral position may be used as an imaging position. In such a case, angiography angle α is 0°. Further, in case of a single axis angiography system, the neutral position is typically defined as shown in FIG. 3A. In multiple axis angiography systems, additional C arms may be present, such as a ceiling mounted C arm. In such a case, the neutral position may be defined as the position in which X-ray emitter 331 and X-ray detector 332 are at the same level as a patient-on-patient surface 340. Finally, angiography angle has been defined based on X-ray emitter 331 but may analogously be defined based on the position of X-ray detector 332.

In act 110, method 100 obtains patient information and target vessel information. The patient information defines individual medical information of a patient. In particular, the individual medical information may include general patient data and pathophysiological information. The general patient data may include information such as gender, age, height or weight. The general patient data thus enable assumptions about the individual vessel geometries and vessel positions of the patient. The pathophysiological information may include at least one diagnosis of a stenosis, an aneurism, a vasodilation, or a vasoconstriction. The pathophysiological information may thus be used to further refine assumptions about the individual vessel geometries and vessel positions of the patient since they enable identifying vessel areas of interest. The target vessel information defines at least one target vessel to be imaged. The target vessel information may for example define a specific vessel segment, such as the left anterior descending artery or an entire vessel tree, such as the coronary arteries.

In act 120, method 100 may further obtain an electrocardiogram (ECG) of the patient. Obtaining an ECG during angiography provides ECG data to method 100 indicating cardiac cycles and thereby data relating to the movement of the heart and the resulting movement of vessels due to the proximity of vessels to the heart and/or due to pressure changes in the vessels. Accordingly, obtaining an ECG during angiography may improve assumptions about the individual vessel geometries and vessel positions of the patient.

It should be noted that in some embodiments, assumptions about the individual vessel geometries and vessel positions of the patient may be determined without reliance on an ECG. Accordingly, act 120 may be skipped in some embodiments of method 100.

Act 120 may include act 121, in which method 100 may select an imaging section of the ECG, which is a section of a cardiac cycle recorded in the ECG indicating a point in time for recording the angiograms. Section of a cardiac cycle refers to segments, complexes, intervals or specific points of a cardiac cycle. In other words, the ECG obtained in act 120 may be used to determine a point in time with regard to the cardiac cycle at which an angiogram should be recorded. For example, certain vessel segments of the coronary arteries may overlap less during specific sections of the cardiac cycle. Accordingly, recording angiograms during such sections may enable better vessel coverage in the angiograms. To further achieve better vessel coverage in the angiograms, method 100 may, as part of act 121, further assign overlap scores to the sections of the cardiac cycle. The overlap scores may indicate the extent of overlap expected during the sections of the cardiac cycle. The imaging section may then be chosen by ranking the sections of the cardiac cycle based on the overlap scores and by choosing the section of the cardiac cycle with the overlap score indicating the lowest extent of overlap.

In some embodiments, act 121 may be skipped, even if act 120 is not skipped. For example, if the target vessel information indicates a target vessel which is not prone to overlap in angiograms due to the cardiac cycle, such as the common iliac artery, method 100 may skip act 121.

In act 130, method 100 may determine a vessel coverage map. The vessel coverage map may be a 2D representation of a 3D vessel segment or 3D vessel tree, as e.g., illustrated in FIGS. 2A and 2B, which indicates the vessel coverage obtained from the angiograms based on the angiography angles α.

Referring to FIGS. 2A and 2B, FIG. 2A shows a 3D frontal view 200A of a heart and of coronary arteries. FIG. 2B shows a 2D representation of the coronary arteries, which may be used as a vessel map. In FIG. 2B, the 2D representation of the coronary arteries is used as the vessel map for a vessel coverage map 200B. The segments of the coronary arteries in both FIGS. 2A and 2B are based on and numbered according to the vessel segmentation as proposed by the American Heart Association (AHA) and as amended by the Society of Cardiovascular Computed Tomography (SCCT). Table 1 provides a short description of the respective vessel segments as well as an abbreviation for each vessel segment.

TABLE 1

Segments of the Coronary Arteries in Figs. 2A and 2B.

| Ref. Sign | Vessel Segment | Abbreviation | Description |
|---|---|---|---|
| 201 | proximal right coronary artery | pRCA | Ostium of the RCA to one-half the distance to the acute margin of heart |
| 202 | Mid RCA | mRCA | End of pRCA to the acute margin of heart |

TABLE 1-continued

Segments of the Coronary Arteries in Figs. 2A and 2B.

| Ref. Sign | Vessel Segment | Abbreviation | Description |
|---|---|---|---|
| 203 | Distal RCA | dRCA | End of mRCA to origin of the PDA (posterior descending artery) |
| 204 | PDA-R | R-PDA | PDA from RCA |
| 205 | Left main | LM | Ostium of LM to bifurcation of LAD (left anterior descending artery) and LCx (left circumflex artery) |
| 206 | Proximal LAD | pLAD | End of LM to the first large septal or D1 (first diagonal), whichever is most proximal |
| 207 | Mid LAD | mLAD | End of proximal LAD to one-half the distance to the apex |
| 208 | Distal LAD | dLAD | End of mid LAD to end of LAD |
| 209 | D1 | D1 | First diagonal branch D1 |
| 210 | D2 | D2 | Second diagonal branch D2 |
| 211 | Proximal LCx | pCx | End of LM to the origin of the OM1 (first obtuse marginal) |
| 212 | OM1 | OM1 | First OM1 traversing the lateral wall of the left ventricle |
| 213 | Mid and distal LCx | LCx | Traveling in the atrioventricular groove, distal to the OM1 branch to the end of the vessel or origin of the L-PDA |
| 214 | OM2 | OM2 | Second marginal OM2 |
| 215 | PDA-L | L-PDA | PDA from LCx |
| 216 | PLB-R | R-PLB | PLB from RCA |
| 217 | Ramus intermedius | RI | Vessel originating from the left main between the LAD and LCx in case of a trifurcation |
| 218 | PLB-L | L-PLB | PLB from LCx |

In addition to the vessel segments listed in Table 1, both FIGS. 2A and 2B also indicate the aortic valve 220.

Vessel coverage map 200B and in particular the choice of 2D representation and segmentation in FIG. 2B is merely provided as an example of a coverage map. The example of FIG. 2B based on the AHA coronary artery segmentation classification is chosen here as it could be one possible 2D representation and vessel segmentation if the vessel coverage map is based on a predetermined vessel map. Another possible example of a predetermined vessel map would be the 2D representation and corresponding vessel segmentation for renal arteries as proposed by Lauder et. al. in: "Journal of EuroPCR in Collaboration with the Working Group on Interventional Cardiology of the European Society of Cardiology, 2018".

Determining the vessel coverage map in act 130 may be based on the target vessel information as well as at least one of the individual medical information and a vessel map. The target vessel information defines the vessel to be imaged. Accordingly, determination of the vessel coverage map is necessarily based on the target vessel information. Further, determining the vessel coverage map may be based on the individual medical information, a vessel map, or both the individual medical information and the vessel map.

In examples in which the vessel coverage map is based on the individual medical information, the vessel coverage map may be determined by deriving the vessel geometry and the vessel segmentation from the individual medical information. For example, based on the age and weight of a patient, method 100 may be able to derive the vessel geometry and the vessel segmentation based on a rule set for determining respective vessel geometries and vessel segmentations. In some examples, the individual medical information may include computer tomography (CT) data, from which method 100 may derive the vessel coverage map.

In examples in which the vessel coverage map is based on the vessel map, method 100 selects a predetermined vessel map based on the target vessel information, such as the 2D representation of the AHA coronary artery segmentation or the 2D representation of the renal artery segmentation of Lauder et. al.

In examples in which the vessel coverage map is based on both the individual medical information and the vessel map, method 100 may select a predetermined vessel map based on the individual medical information. For example, method 100 may select a vessel map from a database based on the parameters included in the individual medical information. The database may e.g., include various vessel maps for the superior mesenteric artery (SMA) for patients of various ages. Method 100 may then determine the vessel coverage map by selecting the appropriate vessel map of the SMA based on the age of the patient as the vessel coverage map. In some embodiments, method 100 may also select a predetermined vessel map based on the target vessel information and then modify the predetermined vessel map based on the individual medical information to determine the vessel coverage map.

In summary, act 130 may determine a vessel coverage map either by using a predetermined vessel map, by selecting a vessel map based on the individual medical information, or by determining a vessel coverage map based on the individual medical information. The vessel coverage map may then be used by subsequent acts of method 100 to determine angiography angles $\alpha$ and to determine the vessel coverage and to determine the completeness of the vessel coverage. It should however be noted that method 100 may also determine the angiography angles $\alpha$ and the completeness of the vessel coverage without a vessel coverage map. In other words, act 130 may be skipped in some embodiments.

In act 140, method 100 may determine at least one angiography angle $\alpha$. Many arteries, such as the coronary arteries shown in FIG. 2A, wrap at least partially around organs or other parts of the body. For example, D2 210 is located lateral to the heart while dRCA 203 is located dorsal to the heart. Accordingly, X-ray transmitter 331 and X-ray detector 332 need to be positioned at one or more angiography angles $\alpha$ enabling angiography system 300 to image these segments while a patient is positioned on patient surface 340.

Method 100 determines angiography angles $\alpha$ based on the patient information and the target vessel information. As already discussed above, the patient information or the individual medical information defined therein, respectively, may enable method 100 to make assumptions about the position of vessels and the corresponding vessel geometry. For example, if the individual medical information indicates the presence of an aneurism in a specific vessel segment, method 100 may be able to derive a probable position of the vessel segment and a probable vessel geometry. In a further example, the individual medical information may include information on a stenosis in mRCA 202, such as length, curvature and segmentation of the stenosis. The stenosis information may for example have been obtained by a CT performed before the angiography. Based on this information, method 100 may derive a probable position of mRCA 202 and a probable geometry of mRCA 202. Using the probable position and the probable geometry of mRCA 202, method 100 may determine one or more angiography angles $\alpha$ leading to one or more angiograms providing a clear view of mRCA 202 and thereby of the stenosis. Accordingly, the angiography angles $\alpha$ determined by method 100 may enable quantification of the stenosis. In yet a further example, the individual medical information may include a diagnostic ECG. The diagnostic ECG may indicate areas of the heart muscles which are under-perfused or ischemic. The heart muscles may be under-perfused or ischemic due to one or more potentially pathological vessels. This information may be used by method 100 to determine one or more angiography angles α leading to one or more angiograms providing a view of the one or more potentially pathological vessels. Method 100 may also derive a probable position of a vessel and a probable vessel geometry based on parameters included in the patient information, such as age, height or weight of a patient. For example, method 100 may derive, based on a database indicating various probable vessel positions and corresponding probable vessel geometries based on such parameters, one or more angiography angles α.

Method 100 may in some embodiments further determine angiography angles in act 140 based on the ECG obtained in act 120. As stated above, the ECG provides ECG data to method 100 indicating cardiac cycles and thereby data relating to the movement of the heart. Method 100 may use the ECG data in act 140 to derive or refine the derived probable vessel positions and corresponding probable vessel geometries and thereby derive or refine the derived angiography angles α. Further, the ECG data may be used in act 140 to determine angiography angles α with reduced overlaps between vessels in the corresponding angiograms.

Method 100 may further determine the at least one angiography angle in order to optimize the resulting angiograms for various use cases, such as 2D and 3D quantitative coronary angiography (QCA), fractional flow reserve (FFR), and/or percutaneous coronary intervention (PCI) robot-guided catheterization. For example, method 100 may in act 140 determine angiography angles leading to angiograms visualizing the pressure difference distal to a lesion and proximal to the lesion during FFR.

Method 100 may further determine the at least one angiography angle α based on the vessel coverage map determined in act 130. As discussed above, method 100 may already have determined angiography angles α based on the patient information. Using the vessel coverage map, method 100 may be able to further refine the angiography angles α determined based on the patient information and the target vessel information. For example, based on stenosis information and the vessel coverage map 200B of FIG. 2B, method 100 may be able to determine angiography angles α by starting with angiography angles α based on the stenosis information. Method 100 may then continue to determine angiography angles α based on the vessel coverage map, which provides method 100 with information on the position of vessel segments adjacent to the vessel segment with the stenosis.

Act 140 may include act 141, in which method 100 may determine, for each angiography angle α, a field of view on the vessel coverage map obtainable by the respective angiography angle α. Each angiography angle α determined in act 140 has a different field of view, i.e., provides a different projection, on a vessel. Using coronary angiography as an example, method 100 may determine in act 141 that an angle of 40° to the left from position $P_0$ in FIG. 3A may have a field of view on pLAD 206, mLAD 207, dLAD 208, D1 209 and D2 210. Likewise, method 100 may determine in act 141 that an angle of 40° to the right from position $P_0$ in FIG. 3A may have a field of view on pRCA 201 and mRCA 202. Using vessel coverage map 200B, method 100 may thus determine which vessel segments of vessel coverage map 200B are expected to be covered by the fields of view obtainable by the respective angiography angles α and may thereby determine whether further angiography angles α need to be determined to provide better cover of the vessel. It will be understood that the field obtainable by the respective angiography angle α may depend on additional factors, such as a position of patient surface 340, a selected magnification of X-ray detector 332 and a source imager distance (SID), i.e., the distance between X-ray emitter 331 and X-ray detector 332, which determines a geometrical magnification factor.

Act 140 may further include act 142, in which method 100 may calculate an expected vessel coverage obtainable based on the fields of view of the angiography angles α. The expected vessel coverage may correspond to a ratio of the vessel coverage map expected to be covered by the fields of view on the vessel coverage map obtainable by the respective angiography angle α to the entire vessel coverage map. Using the preceding example of two projections at 40° left and right of position $P_0$, the ratio could for example be calculated to be approximately 39% because the two projections cover 7 out of 18 segments of the coronary arteries. In another example, the ratio may be calculated in terms of the length of the vessel segments covered to the entire length of the target vessel. It will be understood that the ratio may be defined in any way which enables the determination of the expected completeness of the vessel coverage based on the angiography angles α determined in act 140 and its sub-acts.

Act 140 may further include act 143, in which method 100 may determine angiography angles α until the calculated expected vessel coverage exceeds a vessel coverage threshold, the vessel coverage threshold indicating a ratio of the vessel coverage and the vessel coverage map. As discussed above, method 100 may determine an expected vessel coverage in act 142, which may be compared in act 143 to the vessel coverage threshold to determine whether the coverage expected to be obtained based on the determined angiography angles α provides sufficiently complete coverage of the target vessel. For example, in some embodiments, the coverage may be considered sufficiently complete if the expected vessel coverage of the target vessel corresponds to 95% of the target vessel. In some embodiments, a higher vessel coverage may be required to consider the vessel coverage complete, such as 99%. In some embodiments, a lower coverage may be sufficient to consider the vessel coverage complete, such as 80%. The exact level of vessel coverage threshold may depend on the use case of the angiograms. For example, in the case of FFR, complete coverage requires coverage of both the vessel segment with the stenosis and the adjacent vessel segments in order to enable the calculation of the pressure ratio.

In summary, method 100 may in acts 140 to 143 determine at least one angiography angle α to obtain a vessel coverage, which is expected to be complete. Whether the coverage is expected to be complete may be determined either based on the patient information and the target vessel information alone or may rely on further aspects, like the ECG, the use case and the vessel coverage map.

In act 150, method 100 may obtain angiograms using the at least one angiography angle α. In some embodiments, method 100 may directly obtain angiograms based on the at least one angiography angle determined in acts 140 to 143. For this purpose, Method 100 may rotate C arm 330 according to the at least one angiography angle α. In some embodiments, method 100 may not directly obtain the angiograms. In such embodiments, method 100 may display the at least one angiography angle α to a medical specialist operating angiography system 300, e.g., via display 350. The medical specialist may then rotate C arm 330 according to the at least one angiography angle α, e.g., via control panel 350. Accordingly, depending on the implementation of method 100, act 150 may be skipped.

In act 160, method 100 analyzes the angiograms obtained using the at least one angiography angle α to determine a vessel coverage of the target vessel. More precisely, method 100 determines in act 160 whether the angiograms obtained based on the at least one angiography angle α determined in act 140 indeed show the expected vessels or vessel segments. To this end, method 100 may employ image segmentation approaches, such as based on convolutional neural networks (cNN), e.g., U-Net, densely connected neural networks, deep-learning methods, graph-partitioning methods, e.g., Markoff random fields (MRF), or region-growing methods, e.g., split-and-merge segmentation, in order to identify the vessels visible in the angiogram. The image segmentation approaches may for example identify one of a centerline of a vessel and a lumen of a vessel. Any one of these image segmentation approaches may be trained on sets of angiograms with annotated centerlines or lumina or some other suitable means of training the image segmentation approaches to enable method 100 in act 160 to identify vessels in the angiograms.

Based on the identified vessels in the angiograms, method 100 compares the identified vessels with the vessels expected based on the at least one angiography angle α in order to determine the vessel coverage of the target vessel. For example, if the expected vessels can be identified in the vessels in the angiogram, the angiogram may be considered to provide good coverage of the vessel or vessel segment. If only a part of the expected vessels can be identified and depending on how much of the vessel can actually be identified, the angiogram may be considered to provide medium or bad coverage. The exact thresholds for good, medium, and bad coverage may depend on how complete the vessel coverage needs to be for the given use case. Assuming an exemplary completeness threshold of the vessel coverage of 80%, if at least 80% of the expected vessels can be identified in an angiogram, the angiogram is considered to provide good coverage. If at least 40% of the expected vessels can be identified in an angiogram, the angiogram may be considered to provide medium coverage. If the coverage is below 40%, the angiogram may be considered to provide bad coverage. More generally speaking, good coverage may mean that the ratio of expected to identified vessels in an angiogram corresponds to the threshold set for complete vessel coverage for the use case of the angiograms. Medium coverage and bad coverage may then be defined as some thresholds below the threshold for complete vessel coverage. It should be noted that instead of three coverage levels, any other number of coverage levels may be used, depending on how detailed the coverage levels need to be distinguished.

The classification of the angiograms regarding their actual vessel coverage compared to the expected coverage may also be visualized for the medical specialist operating angiography system 300. As shown in FIG. 2B, vessel coverage map 200B may indicate good, medium and bad coverage. In the example of FIG. 2B, vessel segments 205 to 213 are well covered by angiograms. Vessel segments 201 to 203, as well as vessel segments 205 and 218 have reached medium coverage. Vessel segments 204 and 216 are still at bad coverage. Comparing these segments to 3D frontal view 200A of the heart of FIG. 2A, the example of coverage map 200B shows that R-PDA 204 and R-PLB 216 and thus the posterolateral part of the heart has not yet been imaged properly by angiograms. While FIG. 2B uses different types of shading to indicate the three coverage levels, the coverage levels may also be visualized using a traffic light system or some other visualization approach.

To further improve identification of vessels visible in the angiograms obtained using the at least one angiography angle α, method 100 may in some embodiments further be able to determine the presence and the position of a contrast medium catheter in the angiograms. Like the centerlines and the lumina of vessels, the contrast medium catheter may be detected in act 160 using image segmentation approaches such as cNNs, MRFs, or any of the aforementioned image segmentation approaches, trained on angiograms including annotated contrast medium catheters. For example, a cNN may be used as an image-to-image network trained on pairs of angiograms and angiograms with annotated contrast medium catheter wires, which outputs contrast medium catheter wire heatmaps. Based on the contrast medium catheter wire heatmaps, method 100 may trace the centerline of the contrast medium catheter wire. The traced contrast medium catheter wire may be used by method 100 to determine a 3D model of the contrast medium catheter wire. The 3D model of the contrast medium catheter wire may then be projected onto a 2D vessel map, such as vessel coverage map 200B, in order to determine the vessel coverage. Accordingly, the contrast medium catheter position may be used to further identify vessels in the angiograms obtained using the at least one angiography angle α.

Act 160 may include act 161, in which method 100 detects, within the angiograms, distorted image areas. The distorted image areas include at least one of overlap and/or foreshortening. Referring to FIG. 2A, overlap may for example occur between pLAD 206, pCx 211 and RI 217. Foreshortening, i.e., appearing shorter than in reality, may in particular occur for longer vessel segments, such as dLAD 208. To detect the distorted image areas, method 100 may employ image segmentation approaches, e.g., cNNs, densely connected neural networks, deep-learning methods, graph-partitioning methods, or region-growing methods. For example, any one of these approaches may be used as an image-to-image network to predict a heatmap indicating areas of overlap or of foreshortening. These image-to-image networks may be trained for example on synthetic angiograms generated by computer tomography angiography (CTA). More precisely, CTA scans may be used to derive a 2D projection of a 3D CTA scan with identified vessel centerlines and/or segmentations, which is then used to train the image-to-image networks.

Act 160 may further include act 162, in which method 100 detects, within the angiograms, pathological vessel segments indicative of a pathophysiological condition. The pathophysiological condition may be one of a stenosis, an aneurism, a vasodilation and a vasoconstriction. In one example, method 100 may detect pathological vessel segments in the angiograms for example based on neural networks, such as ResNet-50, ResNet-101, Inception ResNet, NASNet or MobileNet trained on annotated angiograms of patients suffering from any one of the above-mentioned pathophysiological conditions. The identified pathological vessel segments may then be used to refine the at least one angiography angle. In a further example, method 100 may detect pathological vessel segments based on automatic lumen segmentation, i.e., the radius profile extracted along the centerlines of the lumina may be used by method 100 to identify pathological vessel segments.

Act 160 may further include act 163, in which method 100 may compare the vessel coverage with the expected vessel coverage calculated in act 142. In other words, method 100 may determine in act 163 if the vessel coverage achieved with the angiograms obtained using the at least one angiography angle α corresponds to the expected vessel coverage. The result of this comparison is then used in act 190, which will be discussed below.

In summary, method 100 analyzes the angiograms obtained using the at least one angiography angle α to identify the vessels visible in the angiograms and to thereby identify how well the angiograms cover the target vessel. In addition, the analysis of the angiograms may identify aspects, such as pathological vessel segments, which may be used to refine the at least one angiography angle α.

In act 170, method 100 may detect vessel segments in the angiograms obtained using the at least one angiography angle α. In other words, method 100 may identify explicitly which vessel segments are visible in the angiograms using the at least one angiography angle α. For example, method 100 may identify OM2 214, L-PDA 215 and PLB-L 218 in an angiogram. By contrast, method 100 identifies visible vessels in act 160 but does not identify individual vessel segments. It will be understood, of course, that in some embodiments, act 170 may be integrated into act 160, i.e., the identification of vessels in act 160 may entail an identification of the vessel segments. Method 100 may identify the vessel segments in act 170 using a learning-based image to-image network trained on pairs of angiograms and corresponding pixel-wise coronary segment annotations. The pixel-wise coronary segment annotations may have been provided by medical specialists or may have been derived from synthetic angiograms obtained by e.g., CTA.

In act 180, method 100 may rank the angiograms obtained using the at least one angiography angle α. The ranking criteria may include at least one of an overlap detection, a foreshortening detection, a detection of pathological vessel segments, and/or image quality. For example, angiograms identified as including distorted image areas in act 161, which may include areas of overlap and of foreshortening, may be ranked lower than angiograms not including such distorted areas. Angiograms including pathological vessel segments, as e.g., detected in act 162, may be ranked higher than angiograms not including such segments given that these angiograms include important diagnostic information. Angiograms with poor image quality, such as angiograms obtained with little contrast applied during imaging or angiograms including noise may be ranked lower than angiograms with good image quality. More generally speaking, the ranking may be indicative of a diagnostic quality, i.e., how well the angiograms may be used for a diagnosis of a patient. Accordingly, the angiograms obtained using the at least one angiography angle α may be ranked based on their diagnostic quality, as informed by the above ranking criteria.

Method 100 may, based on the ranking determined in act 190, decide that some angiograms obtained using the at least one angiography angle α, need to be obtained again. This decision may for example be based on a diagnostic quality score. For example, the angiograms may be assigned points for each of the ranking criteria. If the resulting score of an angiogram is below a diagnostic quality threshold, method 100 may determine that the angiogram needs to be obtained again.

In act 190, method 100 determines, based on the vessel coverage, additional angiography angles α. More precisely, based on the vessel coverage determined in act 160, method 100 determines whether to repeat acts 140 to 180 to determine additional angiography angles in order to increase the vessel coverage already obtained with the angiograms based on the at least one angiography angle α. Determining additional angiography angles includes both determining further angiography angles as well as modifying the at least one angiography angle α. Act 190 is therefore shown in the flowchart of FIG. 1 as an arrow splitting into two and returning either to act 140 or continuing to the termination of method 100.

Since the at least one angiography angle α has been determined in act 140 with the expectation to achieve complete vessel coverage as required for the given use case, method 100 determines in act 190 to repeat acts 140 to 180 if the expected vessel coverage has not been achieved. This is further shown by the vessel coverage threshold discussed above with regard to acts 142, 143 and 163. Method 100 calculates the expected vessel coverage in act 142 and continues to determine angiography angles α in act 143 until the expected vessel coverage exceeds the vessel coverage threshold. In act 163, method 100 determines whether the actual vessel coverage exceeds the vessel coverage threshold. If the actual vessel coverage as determined in act 160 is below the vessel coverage threshold, i.e., if the actual vessel coverage obtained using the at least one angiography angle α does not provide complete coverage of the target vessel as required by the use case, method 100 determines in act 190 to return to act 140 in order to determine additional angiography angles to increase the vessel coverage. Repeating act 140 is based on the analysis of the angiograms performed in act 160, as will be discussed in the following.

As discussed above, method 100 identifies vessels visible in the angiograms obtained using the at least one angiography angle α and compares the identified vessels with the expected vessels. Based on this comparison, method 100 may, when repeating act 140, determine that the previously determined at least one angiography angle α needs to be modified. For example, method 100 may have originally determined in act 140 that an angiography angle of 40° to the right from position $P_0$ in FIG. 3A may lead to an angiogram showing pRCA 201 and mRCA 202. However, upon analysis in act 160, method 100 determined that the angiogram taken at this angle shows pRCA 201 and mRCA 202 only partially (e.g., the section where both vessel segments connect, which is furthest to the right, as shown in FIG. 2A). Accordingly, upon repeating act 140, method 100 may modify the angle to e.g., 38° in order to improve the coverage of pRCA 201 and mRCA 202. Of course, method 100 may also determine in act 140, based on the analysis in act 160, to determine entirely new angiography angles instead of or in addition to modifying the at least one angiography angle α.

Further, method 100 may, when repeating act 140, modify the at least one angiography angle α based on the distorted image areas detected in act 161. For example, modifying the at least one angiography angle may reduce or remove an overlap between vessels. The same applies to the reduction or removal of foreshortening of vessels.

Further, method 100 may, when repeating act 140, modify the at least one angiography angle α or may determine additional angiography angles based on the pathological vessel segment detected in act 162. For example, method 100 may determine additional angiography angles to obtain angiograms covering vessel segments adjacent to the pathological vessel segment detected in act 162 in order to perform FFR. In a further example, method 100 may modify the at least one angiography angle α which lead to obtaining the angiogram of the pathological vessel segment in order to provide an improved angiogram of the pathological vessel segment, e.g., to obtain more complete coverage of the pathological vessel segment. To this end, method 100 may employ a machine learning algorithm to determine modified or further angiography angles based on the pathological vessel segment. The machine learning algorithm may have been trained on annotated angiograms of pathological vessel segments and a corresponding rule set determining how to determine additional or modified angiography angles. The rule set may be a dataset, on which the machine learning algorithm performs a single nearest neighbor search. The machine learning algorithm may also rely on single view human avatar reconstruction, i.e., a 3D reconstruction of the vessel from the angiogram showing the pathological segment. In a further example, method 100 may, based on the pathological vessel segment detected in act 162, determine additional angiography angles by mapping the angiograms obtained using the at least one angiography angle α onto latent code with a neural network, such as mixture density networks or cNNs. The latent code may be combined with a code obtained from the pathological vessel segment using an embedding layer. The combined code may be passed through a multilayer perceptron (MLP) decoder, which then outputs one or more additional angiography angles. In this example, the neural network may be trained with pairs of angiograms and sets of optimal next angiography angles.

Further, method 100 may, when repeating act 140, modify the at least one angiography angle α or may determine additional angiography angles based on the identified vessel segments in act 170. For example, if method 100 identifies mLAD 207 in an angiogram in act 170, method 100 may determine, when repeating act 140, additional angiography angles to obtain coverage of pLAD 206 and dLAD 208.

Finally, method 100 may, when repeating act 140, modify the at least one angiography angle α or may determine additional angiography angles based on the ranking of the angiograms determined in act 180. For example, method 100 may, when repeating act 140, determine additional angiography angles to obtain angiograms with higher rankings, i.e., higher diagnostic scores, or may modify the at least one angiography angle α to increase the diagnostic score of angiograms obtained using the at least one modified angiography angel α.

In summary, if at act 190, method 100 determines that the vessel coverage is not complete for the given use case, act 140 is repeated to determine additional angiography angles, which includes modifying the at least one angiography angle α, and act 160 is repeated to analyze angiograms obtained using the additional angiography angles. Method 100 continues repeating acts 140 and 160 until method 100 determines at act 190 that the vessel coverage is complete for the given use case. It will be understood that method 100 will likewise repeat the sub-acts of act 140 and act 160 as well as act 170 and act 180 if these acts are implemented. Method 100 thus determines angiography angles and analyzes angiograms obtained using these angiography angles until method 100 determines that the vessel coverage of the target vessel is complete for the given use case.

Method 100 may also be used to train medical specialists to better determine angiography angles manually. In such implementations of method 100, method 100 may determine the angiography angles as discussed above and may then compare them to the angiography angles chosen by the medical specialist. Such a training may lead to a reduced absorbed dose and to a reduced use of contrast agent. Further, method 100 may also output explanations for the reasons specific angiography angles have been determined to improve the training of medical specialists.

As briefly discussed above, FIGS. 3A and 3B show exemplary angiography system 300. In FIG. 3A, angiography system is in neutral position $P_0$. In FIG. 3B, angiography system 300 is in a rotated position $P_1$. As discussed above, the angle between the two positions is referred to as the angiography angle α. Angiography system 300 includes C arm 330, on which X-ray emitter 331 and X-ray detector 332 may be mounted. C arm 330 and thereby X-ray emitter 331 and X-ray detector 332 are positioned to center around patient surface 340. X-ray emitter 331 may emit X-rays which may penetrate through a patient positioned on patient surface 340. X-ray detector 332 detects the X-rays emitted from X-ray emitter 331. When a patient on patient surface 340 is injected with a radio-opaque contrast agent into the patient's vessels, some of the X-rays emitted by X-ray emitter 331 are absorbed by the radio-opaque contrast agent, leading X-ray detector 332 to detect an image of the vessels filled with the radio-opaque contrast agent, i.e., an angiogram. X-ray emitter 331 and X-ray detector 332 may also collectively be referred to as x-ray imaging means.

C arm 330 may be coupled to C arm rotation unit 320. C arm rotation unit 320 may be any motorized means configured to rotate C arm 330 according to the at least one angiography angle α determined by method 100. C arm rotation unit 320 may be attached to and controlled by C arm control until 310. C arm control unit 310 may be any kind of circuitry capable of controlling C arm 330. For example, C arm control unit 310 may include computing device 400 of FIG. 4 or may be configured to interface with C computing device 400.

Angiography system 300 may further include a control panel 350 mounted onto a side surface of patient surface support 341. Control panel 350 may be used to control C arm 330 in embodiments in which method 100 displays the at least one angiography angle α to the medical specialist instead of operating C arm 330 directly via method 100. FIG. 3. does not show any connections between control panel 350 and C arm 330 to simplify the depiction of exemplary angiography system 300. In some embodiments, the connection may be wireless. In some embodiments, the connection may be wired and may e.g., be integrated into the ceiling of the room where angiography system 300 is located.

Angiography system 300 may finally also include a display 360. Display 360 may be used to display information to the medical specialist, such as vessel coverage map 200B or the at least one angiography angle α.

Figure 4:
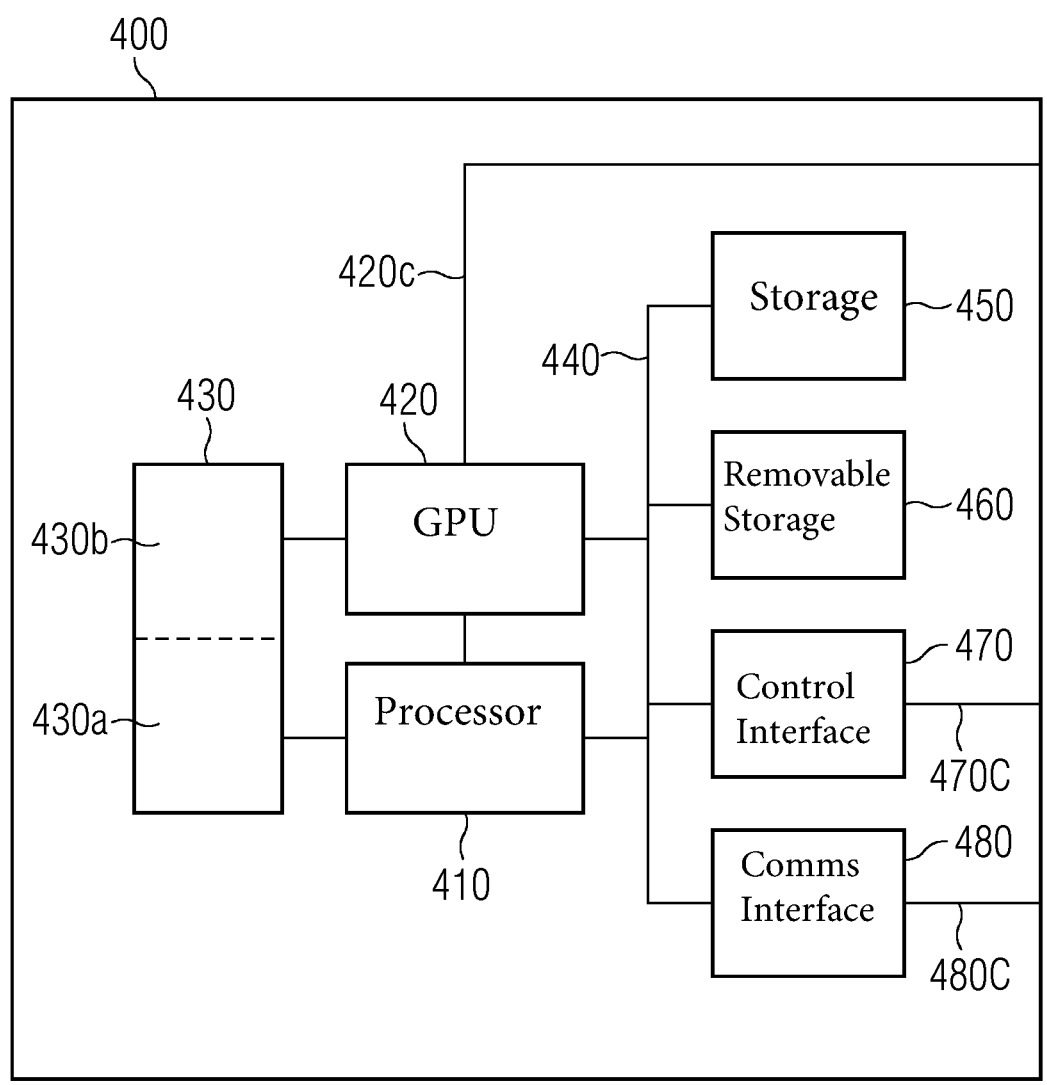
FIG. 4 shows an exemplary computing device according to embodiments.

FIG. 4 shows a computing device 400 configured to perform method 100. Computing device 400 may include a processor 410, a graphics processing unit (GPU) 420, a memory 430, a bus 440, a storage 450, a removable storage 460, an angiography system control interface 470 and a communications interface 480.

Processor 410 may be any kind of single-core or multi-core processing unit employing a reduced instruction set (RISC) or a complex instruction set (CISC). Exemplary RISC processing units include ARM based cores or RISC V based cores. Exemplary CISC processing units include x86 based cores or x86-64 based cores. Processor 410 may perform instructions causing computing device 400 to perform method 100. Processor 410 may be directly coupled to any of the components of computing device 400 or may be directly coupled to memory 430, GPU 420 and bus 440.

GPU 420 may be any kind of processing unit optimized for processing graphics related instructions or more generally for parallel processing of instructions. As such, GPU 420 may perform part or all of method 100 to enable fast parallel processing of instructions relating to method 100. It should be noted that in some embodiments, processor 410 may determine that GPU 420 need not perform instructions relating to method 100. GPU 420 may be directly coupled to any of the components of computing device 400 or may be directly coupled to processor 410 and memory 430. GPU 420 may also be coupled to a display, such as display 360 of angiography system 300, via connection 420C. In some embodiments, GPU 420 may also be coupled to bus 440.

Memory 430 may be any kind of fast storage enabling processor 410 and GPU 420 to store instructions for fast retrieval during processing of the instructions well as to cache and buffer data. Memory 430 may be a unified memory coupled to both processor 410 and GPU 420 enabling allocation of memory 430 to processor 410 and GPU 420 as needed. Alternatively, processor 410 and GPU 420 may be coupled to separate processor memory 430*a* and GPU memory 430*b*.

Storage 450 may be a storage device enabling storage of program instructions and other data. For example, storage 450 may be a hard disk drive (HDD), a solid state disk (SSD) or some other type of non-volatile memory. Storage 450 may for example store the instructions of method 100 as well as the e.g., the angiograms obtained using the at least one angiography angle α.

Removable storage 460 may be a storage device which can be removably coupled with computing device 400. Examples include a digital versatile disc (DVD), a compact disc (CD), a Universal Serial Bus (USB) storage device, such as an external SSD, or a magnetic tape. Removable storage 440 may for example be used to provide the patient information and the target vessel information to computing device 900 and thereby to method 100 or to store the angiograms. It should be noted that removable storage 460 may also store other data, such as instructions of method 100, or may be omitted.

Storage 450 and removable storage 460 may be coupled to processor 410 via bus 440. Bus 440 may be any kind of bus system enabling processor 410 and optionally GPU 420 to communicate with storage device 450 and removable storage 460. Bus 440 may for example be a Peripheral Component Interconnect express (PCIe) bus or a Serial AT Attachment (SATA) bus.

Angiography system control interface 470 may enable computing device 400 to interface with angiography system 300 via connection 470C to control C arm 330 in accordance with method 300. For example, angiography system control interface 470 may be dedicated logic circuitry configured to control rotation of C arm 330. In some embodiments, angiography system control interface 470 may be C arm control unit 310. In some embodiments, angiography system control interface 470 may also be omitted and computing device 400 interfaces with angiography device 300 solely via communications interface 480. In such embodiments, processor 410 may control C arm directly via communications interface 470.

Communications interface 480 may enable computing device 400 to interface with external devices, either directly or via network, via connection 480C. Communications interface 480 may for example enable computing device 400 to couple to a wired or wireless network, such as Ethernet, Wifi, a Controller Area Network (CAN) bus or any bus system appropriate in medical systems. For example, computing device 400 may be coupled with angiography system 300 via connection 480C in order to receive angiograms or to transmit coverage map 200B and the at least one angiography angle α. Communications interface may also be a USB port or a serial port to enable direct communication with an external device.

As stated above, computing device 400 may be integrated with angiography system 300. For example, computing device 400 may be integrated with C arm control unit 330 or may be placed inside patient surface support 340.

Implementations may further be illustrated by the following examples.

In an example, an angiography method for determining angiography angles includes the acts of: obtaining patient information and target vessel information, wherein the patient information defines individual medical information of a patient and wherein the target vessel information defines at least one target vessel to be imaged; determining at least one angiography angle based on the patient information and the target vessel information; analyzing angiograms obtained using the at least one angiography angle to determine a vessel coverage of the target vessel; and based on the vessel coverage, determining additional angiography angles.

In an example, the individual medical information may include general patient data and pathophysiological information.

In an example, determining the at least one angiography angle may be further based on the pathophysiological information, wherein the pathophysiological information may include at least one diagnosis of a stenosis, an aneurism, a vasodilation and a vasoconstriction.

In an example, analyzing the angiograms obtained using the at least one angiography angle may include detecting, within the angiograms, distorted image areas, the distorted image areas including at least one of overlap and foreshortening; and determining the additional angiography angles may include modifying the at least one angiography angle to reduce the distorted image areas.

In an example, analyzing the angiograms obtained using the at least one angiography angle may include detecting, within the angiograms, pathological vessel segments indicative of a pathophysiological condition; and determining the additional angiography angles may include determining angiography angles having a field of view covering the pathological vessel segments.

In an example, the method may further include obtaining an electrocardiogram (ECG) of the patient, and wherein the ECG may at least be used to: further determine the at least one angiography angle; and select an imaging section of the ECG, the imaging section being a section of a cardiac cycle recorded in the ECG indicating a point in time for recording the angiograms.

In an example, the method may further include determining a vessel coverage map based on the target vessel information as well as at least one of the individual medical information and a vessel map, wherein, if the vessel coverage map is based on both the individual medical information and the vessel map, the vessel map may be selected based on the individual medical information.

In an example, determining the at least one angiography angle may further be based on the vessel coverage map.

In an example, determining the at least one angiography angle based on the vessel coverage map may include: determining, for each angiography angle, a field of view on the vessel coverage map obtainable by the respective angiography angle; calculating an expected vessel coverage obtainable based on the fields of view of the angiography angles; and determining angiography angles until the calculated expected vessel coverage exceeds a vessel coverage threshold, the vessel coverage threshold indicating a ratio of the vessel coverage and the vessel coverage map.

In an example, analyzing the angiograms obtained using the at least one angiography angle to determine a vessel coverage of the target vessel may include comparing the vessel coverage with the expected vessel coverage; and determining the additional angiography angles based on the vessel coverage may include determining angiography angles increasing the vessel coverage if the vessel coverage is below the vessel coverage threshold.

In an example, the method may further include detecting vessel segments in the angiograms obtained using the at least one angiography angle and determining additional angiography angles may further be based on the detected vessel segments.

In an example, the method may further include: ranking the angiograms obtained using the at least one angiography angle based on at least one of overlap detection, foreshortening detection, detection of pathological vessel segments and image quality, wherein determining additional angiography angles may further be based on the ranking.

In an example, the method may further include obtaining angiograms using the at least one angiography angle.

In an example, an angiography device includes x-ray imaging means rotatably arranged around a patient surface, the patient surface configured to support a patient, wherein the x-ray imaging means are configured to be rotated around the patient surface according to an angiography angle; and processing means including at least one processor, the processor configured to determine angiography angles according to the angiography method of any one of the preceding examples.

In an example, a non-transitory computer-readable storage medium is configured to store instructions, the instructions being configured to be performed by at least one processor, wherein the instructions cause the at least one processor to perform the method of any one of the preceding examples.

The preceding description has been provided to illustrate the determination of angiography angles in order to obtain optimal vessel coverage for the respective use case. It should be understood that the description is in no way meant to limit the scope of the invention to the precise embodiments discussed throughout the description. Rather, the person skilled in the art will be aware that these embodiments may be combined, modified or condensed without departing from the scope of the invention as defined by the following claims.

The invention claimed is:

1. An angiography method for determining angiography angles, the method comprising:
    obtaining patient information and target vessel information, wherein the patient information defines individual medical information of a patient and wherein the target vessel information defines at least one target vessel to be imaged;
    determining at least one angiography angle based on the patient information and the target vessel information;
    determining a vessel coverage of the target vessel by analysis of angiograms obtained using the at least one angiography angle; and
    based on the vessel coverage, determining additional angiography angles.

2. The angiography method of claim 1, wherein the individual medical information includes general patient data and pathophysiological information.

3. The angiography method of claim 2, wherein determining the at least one angiography angle is further based on the pathophysiological information, wherein the pathophysiological information includes at least one diagnosis of a stenosis, an aneurism, a vasodilation and a vasoconstriction.

4. The angiography method of claim 1, wherein:
    determining the vessel coverage includes detecting, within the angiograms, distorted image areas, the distorted image areas including at least one of overlap and foreshortening; and
    wherein determining the additional angiography angles includes modifying the at least one angiography angle to reduce the distorted image areas.

5. The angiography method of claim 1, wherein:
    determining the vessel coverage includes detecting, within the angiograms, pathological vessel segments indicative of a pathophysiological condition; and
    wherein determining the additional angiography angles includes determining angiography angles having a field of view covering the pathological vessel segments.

6. The angiography method of claim 1, further comprising obtaining an electrocardiogram—ECG—of the patient, and wherein the ECG is at least used to:
    determine the at least one angiography angle; and
    select an imaging section of the ECG, the imaging section being a section of a cardiac cycle recorded in the ECG indicating a point in time for recording the angiograms.

7. The angiography method of claim 1, further comprising:
    determining a vessel coverage map based on the target vessel information as well as at least one of the individual medical information and a vessel map,
    wherein, when the vessel coverage map is based on both the individual medical information and the vessel map, the vessel map is selected based on the individual medical information.

8. The angiography method of claim 7, wherein determining the at least one angiography angle is further based on the vessel coverage map.

9. The angiography method of claim 8, wherein determining the at least one angiography angle based on the vessel coverage map includes:
    determining, for each angiography angle, a field of view on the vessel coverage map obtainable by the respective angiography angle;
    calculating an expected vessel coverage obtainable based on the fields of view of the at least one angiography angles; and
    determining the at least one angiography angles until the calculated expected vessel coverage exceeds a vessel coverage threshold, the vessel coverage threshold indicating a ratio of the vessel coverage and the vessel coverage map.

10. The angiography method of claim 9, wherein:
    determining the vessel coverage of the target vessel includes comparing the vessel coverage with the expected vessel coverage; and
    wherein determining the additional angiography angles based on the vessel coverage includes determining angiography angles increasing the vessel coverage when the vessel coverage is below the vessel coverage threshold.

11. The angiography method of claim 1, further comprising detecting vessel segments in the angiograms obtained using the at least one angiography angle, and
    wherein determining additional angiography angles is further based on the detected vessel segments.

12. The angiography method of claim 1, further comprising:
   ranking the angiograms obtained using the at least one angiography angle based on at least one of overlap detection, foreshortening detection, detection of pathological vessel segments and image quality,
   wherein determining additional angiography angles is further based on the ranking.

13. The angiography method of claim 1, further comprising:
   obtaining angiograms using the at least one angiography angle.

14. An angiography device comprising:
   x-ray emitter and detector rotatably arranged around a patient surface, the patient surface configured to support a patient, wherein the x-ray emitter and detector are configured to be rotated around the patient surface according to an angiography angle; and
   at least one processor configured to:
   obtain patient information and target vessel information, wherein the patient information defines individual medical information of a patient and wherein the target vessel information defines at least one target vessel to be imaged;
   determine at least one angiography angle based on the patient information and the target vessel information;
   determine a vessel coverage of the target vessel by analysis of angiograms obtained using the at least one angiography angle; and
   based on the vessel coverage, determine an additional angiography angle.

15. The angiography device of claim 14, wherein the at least one processor is configured to determine the vessel coverage by detection, within the angiograms, of a pathological vessel segment indicative of a pathophysiological condition and to determine the additional angiography angles as having a field of view covering the pathological vessel segments.

16. The angiography device of claim 14, wherein the at least one processor is further configured to determine a vessel coverage map based on the target vessel information as well as at least one of the individual medical information and/or a vessel map, wherein, when the vessel coverage map is based on both the individual medical information and the vessel map, the vessel map is selected based on the individual medical information.

17. A non-transitory computer-readable storage medium configured to store instructions, the instructions being configured to be performed by at least one processor, wherein the instructions cause the at least one processor to:
   obtain patient information and target vessel information, wherein the patient information defines individual medical information of a patient and wherein the target vessel information defines at least one target vessel to be imaged;
   determine at least one angiography angle based on the patient information and the target vessel information;
   determine a vessel coverage of the target vessel by analysis of angiograms obtained using the at least one angiography angle; and
   based on the vessel coverage, determine an additional angiography angle.

18. The non-transitory computer-readable storage medium of claim 17 wherein the instructions cause the at least one processor to determine the vessel coverage by detection, within the angiograms, of a pathological vessel segment indicative of a pathophysiological condition and to determine the additional angiography angles as having a field of view covering the pathological vessel segments.

19. The non-transitory computer-readable storage medium of claim 17 wherein the instructions further cause the at least one processor to determine a vessel coverage map based on the target vessel information as well as at least one of the individual medical information and/or a vessel map, wherein, when the vessel coverage map is based on both the individual medical information and the vessel map, the vessel map is selected based on the individual medical information.

* * * * *